Dec. 20, 1966  J. THORDARSON  3,292,906
FISHING REEL ASSEMBLY
Filed Jan. 14, 1965  2 Sheets-Sheet 1
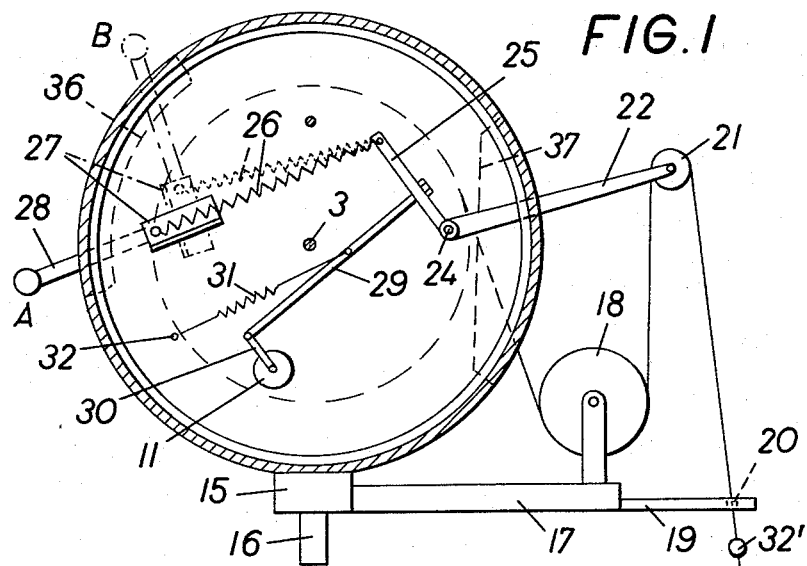
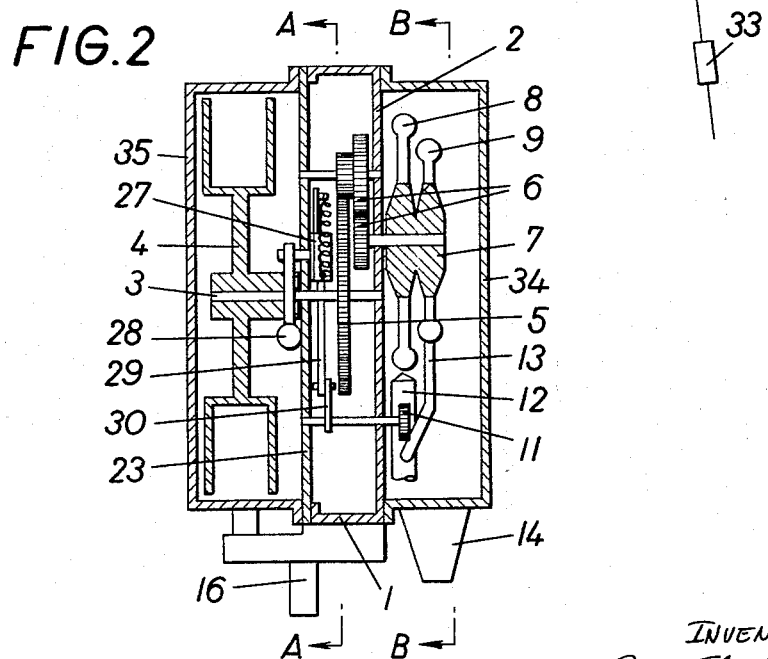
INVENTOR
Jon Thordarson
By Watson, Cole, Grindle & Watson
ATTORNEYS Dec. 20, 1966  J. THORDARSON  3,292,906
FISHING REEL ASSEMBLY
Filed Jan. 14, 1965  2 Sheets-Sheet 2
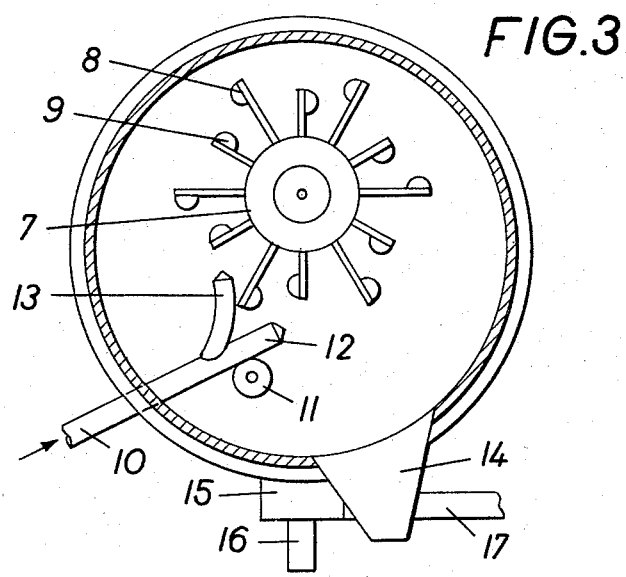
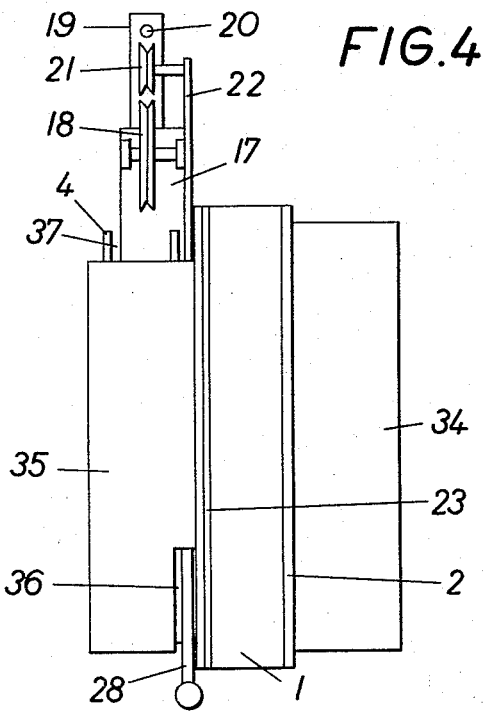
INVENTOR
Jon Thordarson
By Watson, Cole, Grindle & Watson
ATTORNEYS

3,292,906
FISHING REEL ASSEMBLY
Jón Thordarson, Reykjalundur, Mosfellssveit, Iceland
Filed Jan. 14, 1965, Ser. No. 425,546
6 Claims. (Cl. 254—173)

The present invention relates to a fishing reel assembly of the type adapted to automatically give and reel in a fishing line in the so-called hand line fishing, wherein a line provided with a number of hooks is successively taken in and given off in the manner known as stroke-hauling and one purpose of the invention is to so construct the assembly that one man may supervise a number of hand lines simultaneously.

Another purpose of the invention is to provide an assembly which is simple in construction and efficient in use, to the effect that once the assembly is manually started, the assembly is automatically continuing its stroke-haul operation and the activity of the operator is restricted to securing the catch and once more set the assembly going.

Further objects and advantages of the invention will be apparent from the following description taken in conjunction with the accompanying drawings, wherein FIGURE 1 is a diagrammatic sectional view along the line A—A of FIGURE 2, illustrating one embodiment of the assembly according to the invention.

FIGURE 2 is an axial sectional view corresponding to that of FIGURE 1.

FIGURE 3 is a sectional view, along the line B—B of FIGURE 2, of the turbine portion of the same assembly.

FIGURE 4 is a view, as seen from above of the entire assembly.

As shown in the drawings, the assembly comprises a housing 1 serving as a protecting support to the active parts of the assembly. The housing 1 includes a pair of mounting plates 2, 23, in which are rotatably mounted a shaft 3 carrying a line reel 4 and a gear 5 which, through a gear system 6 is rotationally driven by means of a turbine wheel 7 carrying a pair of oppositely directed blade sets 8, 9. The turbine is fed with driving fluid through a supply conduit 10, such as water under pressure provided by a pump, not shown, driven from any power source, such as the engine of the vessel. The conduit 10 is provided with an adjustment and switching means 11 serving to direct the feed from the conduit 10 to either of a pair of nozzles 12, 13 operating the blade wheels 8 and 9, respectively, thereby rotating the wheel 7, together with the reel 4 in either of two opposite directions. The driving fluid from the blade sets 8 or 9 is collected in the closed housing 34 and let out through the spout 14.

The main housing 1 is supported by a base member 15 having a projection 16 adapted to be mounted in a suitable socket, not shown, mounted on the rail of the boat or vessel. The base member 15 also carries a horizontally extending plate member 17, at the far end of which there is mounted a guide roller 18 and a horizontally extending feeler arm 19 provided with a vertically extending aperture 20 through which the fishing line is carried.

The fishing line is wound upon the reel 4, from which it is carried around the roller 18 and around a roller 21, mounted at the free end of a pivotable lever 22 and thence downwardly through the aperture 20 in the feeler arm 19 into the water.

The lever 22 is pivotably mounted at 24 on the mounting plate 23 and has a crank formed extension 25, the free end of which is connected through a spring 26 with a pivotably mounted member 27 carrying a handle 28. Along the length of the extension 25, the same is rigidly connected to one end of a lever 29, the other end of which is hingedly connected to a lever 30 rigidly connected to the shaft of switching means 11. Along the length of the lever arm 29, the same is connected, through a spring 31, to a fixed point 32 on the mounting plate 23. This spring 31 serves to make the lever arm 29 follow the movements performed by the crank lever 22, 25 and to add to the action of the spring 26 on the extension 25.

FIGURE 1 also shows a stopper ball 32' mounted on the fishing line at a certain distance above the lead 33 of the same.

The cap 35 enclosing the reel 4 is provided with two apertures, of which one, 36, accommodates the handle 28 and the second, 37, serves the run of the line and the lever 22.

The reel assembly of the invention operates in the following manner:

Initially the turbine is started by connecting the conduit 10 to the driving fluid pump, not shown. The handle 28 is then in position A, FIGURE 1, the so-called hauling position, and the line is fully wound on to the reel, with the stopper ball 32' in engagement with the feeler arm 19, with a pressure just balancing the hauling force of the turbine on the reel. Provided that the hooks are baited, the line is now ready to be given off. The giving is started by moving the handle 28 from position A to position B, FIGURE 1, thereby shortening in on the spring 26, to the effect that the lead 33, of about 1000 grams, subjects the lever arm 22 to a downwardly directed force, whereby the lever 29, through the lever 30 turns the shaft of the means 11 clockwise, so that the feed of the nozzle 12 is interrupted and the nozzle 13 is connected to the conduit 10, to the effect that the blades 9 are hit by the jet issued by the nozzle 13, and the turbine wheel 7 is rotated clockwise and the line is given off from the reel 4. This operation is continued until the effect of the lead 33 is diminished, i.e. when the lead 33 hits the sea bottom. When, in that manner, the downward force on the lever 22 is released, the lever is again turned counterclockwise by the effect of the spring 26, thereby also causing the lever 29 to turn the lever 30 counterclockwise, so that the switching means 11 is actuated for switching the conduit 10 from nozzle 13 to nozzle 12, whereby the turbine wheel 7 is caused to turn counterclockwise, FIGURE 3, hauling in the line until the lead 33 is lifted from the sea bottom and again is subjecting the lever 22 to the weight of the lead. This reciprocating movement of the lever 22, with the accompanying switching operations, is continued as long as the handle B is maintained in position B, FIGURE 1, thereby subjecting the line to a stroke-haul movement. This balance condition is governed by the relation between the forces of the springs 26 and 31 on one side and the weight of the lead on the other side, and may be adjusted at will by suitably adjusting the spring forces.

When the operator wishes to ascertain if one or more fishes are hooked on, he moves the handle 28 back to position A, FIGURE 1, whereby the spring 26 is stretched and the lever 22 moves to its top position, thereby initiating the switching operation, in the manner described, so that the turbine wheel 7 and the reel 4 is rotated for hauling in on the line. The hauling is continued until the stopper ball 32' strikes against the feeler arm 19. In this position, the continued hauling causes the lever 22 to swing downwardly so as to once again start the giving off operation, due to the fact that the force of the spring 26 is now increased as compared with the spring force exercised when the handle 28 is in position B. Consequently, the pressure of the ball 32' against the arm 19 is again released, and a new balance situation is established, with small, alternative hauling and giving periods, determined by the force exercised by the spring 26. The periodicity of this balance situation may also be adjusted by adjustment of the spring 26 relatively to the maximum hauling effort of the turbine, an adjustment which may be effected by adjustment of the length of the member 27 or, possibly, the springs 26, 31 under due consideration of the conditions under giving off, as described above. During this hauled in period, the catch may be secured and the hooks baited once more.

I claim:

1. A fishing line hoist assembly for moving a fishing line a substantial distance in first and second directions, comprising a reel adapted to receive said line, a reversible motor means connected to said reel, switching means selectively movable between a first position and a second position to control said motor means, at least one spring connected to said switching means to urge the same toward one of said positions, a guide on said switching means for receiving said line so as to sense the pull on said line, the tension in said spring being so related to the normal pull on said line to cause the moving of said switching means to said first position whereby said line is moved in said first direction, stop means for changing the pull on said line near the end of the travel in said first direction to cause the moving of said switching means to said second position whereby to effect relatively small amplitude alternative driven movements of said line in said first and second directions, and control means to cause said line to move to the end of the travel in said second direction.

2. The combination of claim 1 wherein said control means includes adjustable means movable between a first and second position so as to vary the tension in said spring, said spring being effective to position said switching means in said first position against the normal pull on said line when said adjustable means is in said first position, the normal pull on said line being effective to position said switching means in said second position against the tension in said spring when said adjustable means is in said second position, whereby to effect positive movement of said line along said substantial distance in both of said first and second directions.

3. The combination of claim 2 wherein said stop means for changing the pull on said line includes a fixed member positioned along the path of said line on the side of said guide remote from said reel, an enlarged portion on said line to cooperate with said fixed member during movement of said line in said first direction, whereby to increase the pull on said line against said spring to effect movement of said switching means to said second position, and a weight attached adjacent the end of said line whereby when an obstacle is encountered to effect slackening of the line and movement of said switching means to said first position by said spring.

4. The combination of claim 1 wherein said reversible motor means includes a turbine having first and second wheels with respective first and second series of blades directed in opposite directions and said motor means includes first and second nozzles for directing pressurized fluid toward said first and second series of blades, respectively, and a valve responsive to said switching means to activate one of said nozzles.

5. A fishing reel assembly as claimed in claim 4, wherein said first and second turbine blade wheels are mounted coaxially, the blades of said first wheel being arranged at a diameter different from that of the blades of said second wheel.

6. The combination of claim 4 wherein said switching means includes a first pivotal lever, said spring being attached to one end of said lever, a second lever fixed to the first mentioned lever to interconnect said valve and said first lever, and a second spring attached to said second lever and tensioned so as to act in concert with the first mentioned spring.

References Cited by the Examiner

UNITED STATES PATENTS

| | | | |
|---|---|---|---|
| 225,909 | 3/1880 | Adams | 254—173 |
| 1,443,689 | 1/1923 | Kanygin. | |
| 2,629,187 | 2/1953 | Nibert | 254—173 X |
| 2,709,867 | 6/1955 | Routh | 254—173 X |
| 2,727,724 | 12/1955 | Biebighauser | 254—173 |
| 3,018,999 | 1/1962 | Hutchinson | 254—184 |

FOREIGN PATENTS 174,762   5/1953   Austria.

SAMUEL F. COLEMAN, *Primary Examiner.*